United States Patent
Bai et al.

(10) Patent No.: US 11,360,617 B2
(45) Date of Patent: Jun. 14, 2022

(54) TOUCH SUBSTRATE AND TOUCH SCREEN

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lu Bai, Beijing (CN); Shijun Wang, Beijing (CN); Zhiying Bao, Beijing (CN); Lei Mi, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 828 days.

(21) Appl. No.: 16/078,039

(22) PCT Filed: Dec. 14, 2017

(86) PCT No.: PCT/CN2017/116072
§ 371 (c)(1),
(2) Date: Aug. 21, 2018

(87) PCT Pub. No.: WO2018/201728
PCT Pub. Date: Nov. 8, 2018

(65) Prior Publication Data
US 2021/0191593 A1  Jun. 24, 2021

(30) Foreign Application Priority Data

May 2, 2017 (CN) .......................... 201710300962.2

(51) Int. Cl.
*G06F 3/041* (2006.01)
*G06F 3/044* (2006.01)

(52) U.S. Cl.
CPC .......... *G06F 3/0443* (2019.05); *G06F 3/0412* (2013.01); *G06F 3/04164* (2019.05)

(58) Field of Classification Search
CPC ... G06F 3/04164; G06F 3/0443; G06F 3/0412
(Continued)

(56) References Cited

U.S. PATENT DOCUMENTS

2016/0187692 A1\* 6/2016 Woo .................. G02F 1/133345
                                                          438/151
2016/0291722 A1\* 10/2016 Du ........................ G06F 3/0443
(Continued)

FOREIGN PATENT DOCUMENTS

| CN | 104808858 A | 7/2015 |
| GN | 205375439 U | 7/2016 |
| GN | 107422930 A | 12/2017 |

OTHER PUBLICATIONS

First Office Action for U.S. Patent Application No. 201710300962.2 dated Aug. 3, 2018.
(Continued)

*Primary Examiner* — Kwin Xie
(74) *Attorney, Agent, or Firm* — Calfee, Halter & Griswold LLP

(57) ABSTRACT

Embodiments of the present disclosure provide a touch substrate, including: a plurality of touch electrodes arranged in a same layer and insulated from each other, the touch electrodes being configured to sense touch signals; and a plurality of first touch signal lines configured to transmit the touch signals, each touch electrode being connected with a corresponding first touch signal line via a first via hole. The touch substrate further includes a plurality of second touch signal lines, wherein an extension direction of the second touch signal lines is different from that of the first touch signal lines, and each touch electrode is connected with a corresponding second touch signal line via a second via
(Continued)

hole. In particular, the second touch signal lines corresponding to different touch electrodes are disconnected from each other. Embodiments of the present disclosure further provide a touch screen including the touch substrate.

18 Claims, 2 Drawing Sheets

(58) Field of Classification Search
USPC .................................................. 345/173–174
See application file for complete search history.

(56) References Cited

U.S. PATENT DOCUMENTS

| | | |
|---|---|---|
| 2016/0291756 A1* | 10/2016 | Li .......................... G06F 3/0412 |
| 2016/0291791 A1* | 10/2016 | Qian ..................... G06F 3/0443 |
| 2016/0328070 A1 | 11/2016 | Lin et al. |
| 2016/0349895 A1 | 12/2016 | Long et al. |
| 2017/0190922 A1* | 7/2017 | Ko .......................... C09D 7/20 |
| 2017/0308221 A1* | 10/2017 | Li .......................... G06F 3/0447 |

OTHER PUBLICATIONS

Search Report and Written Opinion for International Application No. PCT/CN2017/116072 dated Mar. 16, 2018.

* cited by examiner

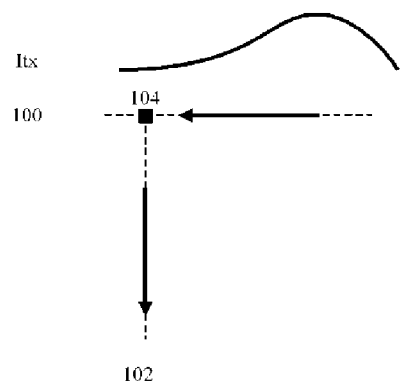 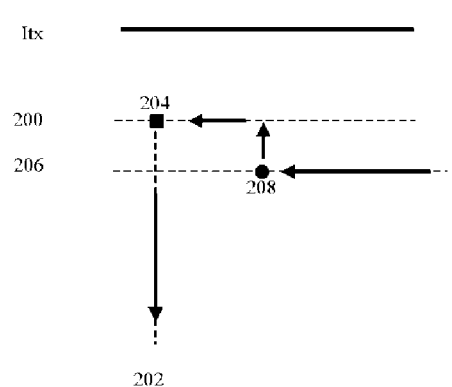
Fig. 3A  Fig. 3B
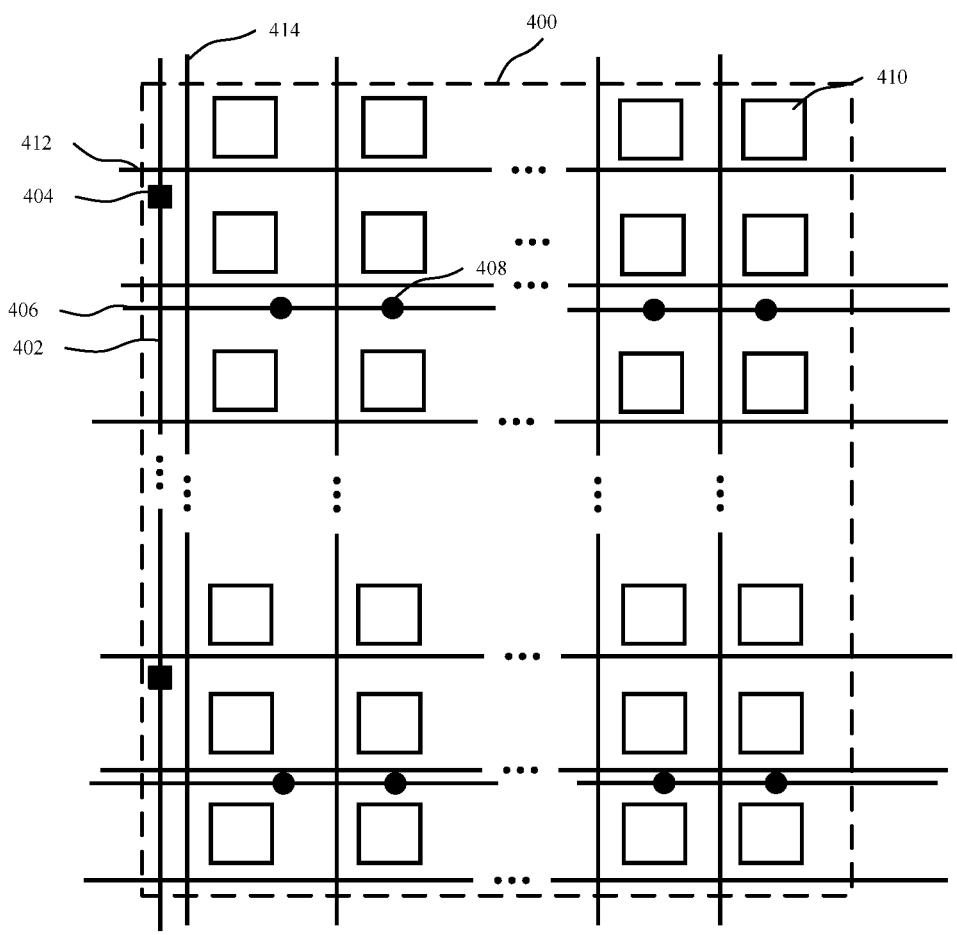
Fig. 4

TOUCH SUBSTRATE AND TOUCH SCREEN

The present application is the U.S. national phase entry of PCT/CN2017/116072 filed on Dec. 14, 2017, which claims the priority of Chinese patent application No. 201710300962.2 filed on May 2, 2017, the entire disclosures of both are incorporated herein by reference.

FIELD OF THE INVENTION

The present disclosure generally relates to the field of display technologies. More specifically, the present disclosure relates to a touch substrate and a touch screen comprising the same.

BACKGROUND ART

The appearance of touch screen has greatly enriched functions of a display device and brought a number of new applications. There are many different ways of sensing for touch screens, for example, an optical way, a microwave way, a resistant way or a capacitive way, among which capacitive touch screens are widely applied in the field of touch display in virtue of their advantages such as accurate and sensitive location, touch comfortableness and long service life.

A capacitive touch screen can be roughly classified into two types depending on the touch structure comprised therein: a mutual-capacitive type and a self-capacitive type. Self-capacitive touch screens are widely applied in the art due to their merits such as high accuracy and high SNR in touch sensing.

SUMMARY

According to one aspect of the present disclosure, a touch substrate is provided. The touch substrate comprises: a plurality of touch electrodes arranged in a same layer and insulated from each other, the touch electrodes being configured to sense touch signals; and a plurality of first touch signal lines configured to transmit the touch signals, each touch electrode being connected with a corresponding first touch signal line via a first via hole. The touch substrate further comprises a plurality of second touch signal lines, wherein an extension direction of the second touch signal lines is different from that of the first touch signal lines, and each touch electrode is connected with a corresponding second touch signal line via a second via hole. In particular, the second touch signal lines corresponding to different touch electrodes are disconnected from each other, so as to prevent interferences between the touch electrodes.

According to some embodiments, the plurality of first touch signal lines is parallel with each other. For example, when the touch electrodes are arranged in a matrix, the first touch signal lines corresponding to each touch electrode in each column are arranged in a row direction of touch electrodes and connected with the corresponding touch electrodes respectively via a first via hole.

According to some embodiments, each touch electrode corresponds to a plurality of second touch signal lines.

According to some embodiments, the touch substrate comprises pixel units arranged in an array, wherein the first touch signal lines extend between two adjacent columns of pixel units, the second touch signal lines extend between rows of pixel units, and the first via holes and the second via holes are located between different adjacent rows of pixel units.

According to some embodiments, each touch electrode corresponds to a plurality of pixel units, and the touch electrode is reused as a common electrode for the correspondingly plurality of pixel units. For example, in a typical 5.5-inch touch screen, each touch electrode corresponds to 40×40 pixels.

According to some embodiments, the touch substrate further comprises a plurality of gate lines parallel with each other and a plurality of data lines parallel with each other. An extension direction of the first touch signal lines is parallel with the data lines, and an extension direction of the second touch signal lines is parallel with the gate lines.

According to some embodiments, the first touch signal lines are arranged in a same layer as the data lines, and the second touch signal lines are arranged in a same layer as the gate lines. In particular, the first touch signal lines and the data lines can be formed through a same patterning process, and the second touch signal lines and the gate lines can be formed through a same patterning process.

According to some embodiments, the touch substrate further comprises: a first insulating layer arranged between the touch electrodes and the first touch signal lines; and a second insulating layer arranged between the first touch signal lines and the second touch signal lines. The first via holes penetrate the first insulating layer, and the second via holes penetrate both the first insulating layer and the second insulating layer.

According to some embodiments, the touch substrate further comprises: a first insulating layer arranged between the touch electrodes and the second touch signal lines; and a second insulating layer arranged between the first touch signal lines and the second touch signal lines. The first via holes penetrate both the first insulating layer and the second insulating layer, and the second via holes penetrate the first insulating layer.

According to some embodiments, the touch electrode comprises a transparent conductive material, and the first insulating layer and the second insulating layer comprise a transparent insulating material.

According to another aspect of the present disclosure, a touch screen is provided, comprising any touch substrate as mentioned above.

It should be understood that the generic depictions above and the detailed depictions below are only exemplary and explanatory for the present disclosure, rather than restrictive in any possible way.

BRIEF DESCRIPTION OF DRAWINGS

In order to illustrate technical solutions in embodiments of the present disclosure more clearly, drawings to be used in the depictions of embodiments will be briefly introduced as follows. Obviously, the drawings described below are only some embodiments of the present disclosure.

FIG. 3A schematically shows a path in which touch signals are transmitted in a conventional touch substrate.

FIG. 3B schematically shows a path in which touch signals are transmitted in a touch substrate according to an embodiment of the present disclosure.

FIG. 4 schematically shows a top view of part of a touch substrate according to an embodiment of the present disclosure.

Figure 1:
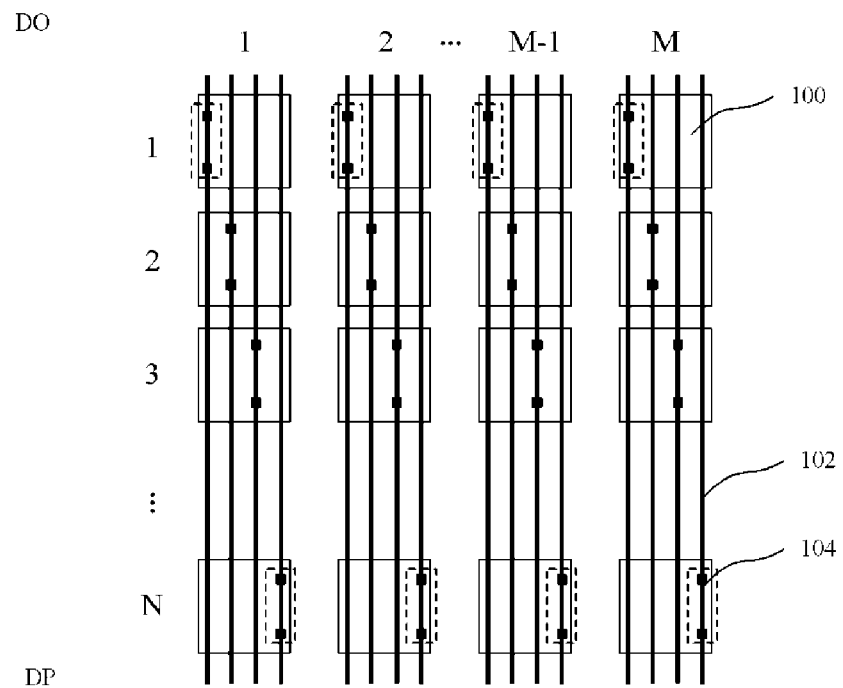
FIG. 1 schematically shows a top view of a conventional touch substrate.

Explicit embodiments of the present disclosure have been shown by the above drawings, and more detailed depictions will be given below. The drawings and the literal depictions are not intended to limit the scope of the present disclosure in any possible way, but instead, to explain to one having ordinary skills in the art the concept of the present disclosure with reference to specific embodiments.

DETAILED DESCRIPTION OF EMBODIMENTS

To render the goals, technical solutions and advantages of embodiments of the present disclosure clearer, the technical solutions in embodiments of the present disclosure will be further described below in detail with reference to the drawings.

A self-capacitive touch screen is configured to detect a touch position of a finger based on the principle of self-capacitance. Specifically, a plurality of touch electrodes arranged in a same layer and independent of each other are provided in a touch substrate. When the touch screen is not touched by a human body, a capacitance born by each touch electrode is a constant value. When the touch screen is touched by a human body, the capacitance born by a touch electrode corresponding to a touch position is the constant value plus a capacitance of the human body. Changes in the capacitance born by the touch electrodes are transmitted via touch signal lines to a touch detection chip, which then determines the touch position in a touch period by analyzing changes in the capacitance of each touch electrode.

In a typical touch substrate, the touch electrodes are arranged in a matrix, and the touch signal lines corresponding to each touch electrode in each column are arranged in a row direction of the touch electrodes and connected with the corresponding touch electrodes respectively via a via hole. It was found by the inventor(s) that, for such an arrangement of the touch signal lines, via holes corresponding to touch electrodes closer to the touch detection chip and via holes corresponding to touch electrodes further away from the touch detection chip will be located at an edge of the touch electrodes. A conductive material for fabricating touch electrodes (a transparent conductive material, e.g., ITO) usually has a greater resistivity than a conductive material for fabricating gate lines and data lines (typically a metallic material, e.g., aluminum and molybdenum). Thus, the touch electrodes have a weaker capability of touch signal transmission, and therefore the touch electrodes closer to the touch detection chip and further away from the touch detection chip have a weaker capability of touch signal detection than other touch electrodes in the touch substrate. As a result, in the entire touch substrate, different positions show different touch sensitivities.

What's even worse, in a case where an input tool having a small contact area with the touch screen such as a stylus is used, the contact area between the stylus and the touch screen can be smaller than 1 mm$^2$, and an area of the touch electrodes can be 10 mm$^2$. When the stylus is in contact with a central position of the touch electrodes closer to the touch detection chip and further away from the touch detection chip, the touch signals need to be transmitted to the touch signal lines via the touch electrodes and via holes located at an edge of the touch electrodes. During this procedure, the intensity of touch signals may suffer such a great loss that the touch detection chip can hardly detect the touch signals, which will lead to a degraded performance of the touch screen and a poor user experience.

FIG. 1 schematically shows a top view of a conventional touch substrate. As shown in FIG. 1, a plurality of touch electrodes 100 are arranged in an M×N matrix. Touch signal lines 102 corresponding to each touch electrode 100 in each column are arranged in a row direction of the touch electrodes 100 and connected with the corresponding touch electrodes 100 respectively via a via hole 104. In the touch substrate, assuming that the touch detection chip is located below the touch substrate, on a DP side closer to the touch detection chip, the via holes 104 of the touch electrodes 100 will be located at a right edge of the touch electrodes 100, and on a DO side further away from the touch detection chip, the via holes 104 of the touch electrodes 100 will be located at a left edge of the touch electrodes 100, as indicated by the dashed blocks in FIG. 1. When a center of the touch electrodes 100 on the DP side or the DO side is touched by a finger or a stylus, the touch signals need to be transmitted to the via holes 104 via the touch electrodes 100 per se, and then to the touch signal lines 102 via the via holes 104. Since the conductive material for fabricating the touch electrodes 100 has a weaker conductivity, the touch signals will suffer a great loss during the transmission, and as a result, the sensitivity of the touch substrate will be decreased.

Figure 2:
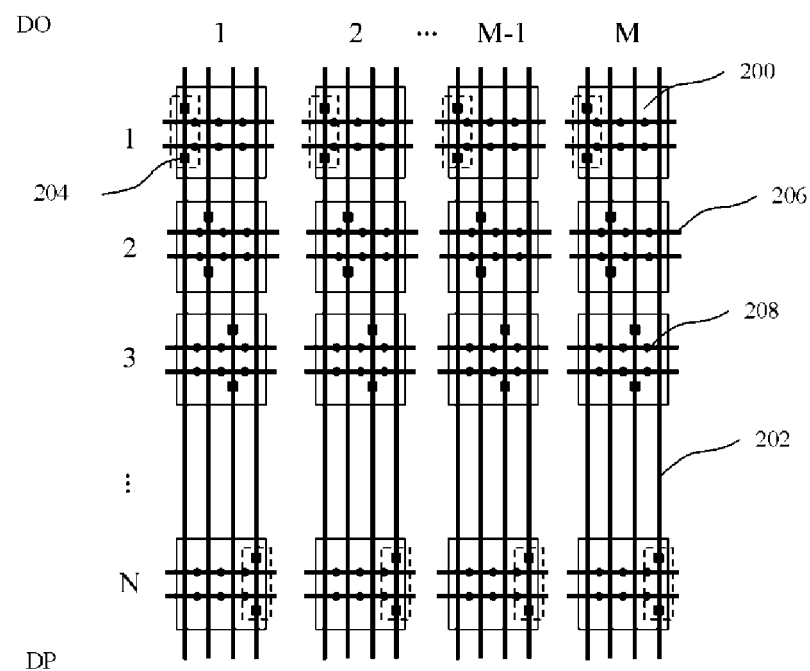
FIG. 2 schematically shows a top view of a touch substrate according to an embodiment of the present disclosure.

To this end, an improved touch substrate is provided in embodiments of the present disclosure. As shown in FIG. 2, the touch substrate comprises a plurality of touch electrodes 200 arranged in a same layer (arranged in same layer means being formed through one single patterning process) and insulated from each other, the touch electrodes 200 being configured to sense touch signals. The plurality of touch electrodes 200 are arranged in an M×N matrix. A plurality of first touch signal lines 202 configured to transmit the touch signals are arranged in a row direction of the touch electrodes 200 and connected with the corresponding touch electrodes 200 respectively via a first via hole 204. The touch substrate further comprises a plurality of second touch signal lines 206, wherein an extension direction of the second touch signal lines 206 is different from that of the first touch signal lines 202, and each touch electrode 200 is connected with a corresponding second touch signal line 206 via a second via hole 206. The second touch signal lines 206 corresponding to different touch electrodes 200 are disconnected from each other, so as to prevent interference between the touch electrodes 200.

In the touch substrate provided by an embodiment of the present disclosure, apart from the first touch signal lines 202, a plurality of second touch signal lines 206 having a different extension direction from the first touch signal lines 202 are also provided. When the user touches a central position of the touch electrodes 200 on the DP side and the DO side, the touch signals are transmitted to the second via holes 208 closest to the first touch signal lines 202 via the closest second touch signal lines 206, then to the first via holes 204 via the second via holes 208 and the touch electrodes 200 per se, then to the first touch signal lines 202 via the first via holes 204, and finally to the touch detection chip (not shown) via the first touch signal lines 202. As compared with the touch substrate of FIG. 1, in the touch substrate of FIG. 2, since the material for fabricating the second touch signal lines 206 has a smaller resistivity than the material for fabricating the touch electrodes 200, the loss of touch signals in the transmission path is greatly reduced. In this way, it is ensured that in the entire touch substrate, different positions exhibit approximately the same touch sensitivity. Moreover, when the touch substrate is used together with an input tool having a small contact area such as a stylus, it can avoid the failure of the touch detection chip to detect the touch signals, and hence improve the sensitivity of the touch substrate.

It should be pointed out that although FIG. 2 shows that each touch electrode 200 corresponds to one first touch signal line 202 and two second touch signal lines 206, each first touch signal line 202 is connected with a corresponding touch electrode 200 via two first via holes 204, and each second touch signal line 206 is connected with a corresponding touch electrode 200 via three second via holes 208, all these numbers are only exemplary and not intended to limit the present disclosure. Those skilled in the art can design different touch substrates based on teachings of the present disclosure. For example, those skilled in the art can make a compromise between the fabrication cost, the complexity and the conductivity, so as to design a touch substrate having a suitable number of first via holes and second via holes.

It should be further pointed out that although the first via holes 204 are rectangular and the second via holes 208 are circular as shown in FIG. 2, this is only for the purpose of differentiation. In fact, the first via holes 204 and the second via holes 208 can have any shape that is technically achievable. Besides, the first touch signal lines 202 and the second touch signal lines 206 are arranged in different layers and insulated from each other by an insulating layer.

FIG. 3A and FIG. 3B show paths in which the touch signals are transmitted in the touch substrate of FIG. 1 and in the touch substrate of FIG. 2. FIG. 3A schematically shows a touch electrode 100 in the touch substrate of FIG. 1, wherein the touch signals are transmitted to the via holes 104 via the touch electrodes 100 per se, and then to the touch signal lines 102 via the via holes 104. As shown in FIG. 3A, an intensity Itx of the touch signals is gradually decreased during the transmission via the touch electrodes 100 due to a great resistivity of the touch electrodes 100. In contrast, FIG. 3B schematically shows a touch electrode 200 in the touch substrate of FIG. 2, wherein the touch signals are first transmitted to the second via holes 208 closest to the first touch signal lines 202 via the second touch signal lines 206 closest to the touch position, then to the first via holes 204 via the second via holes 208 and the touch electrodes 200 per se, and next to the first touch signal lines 202 via the first via holes 204. Since the touch signals are transmitted over a comparatively short distance via the touch electrodes 200 per se, the intensity Itx of the touch signals is barely decreased.

Returning to FIG. 2, in an exemplary embodiment, the plurality of first touch signal lines 202 is parallel with each other. For example, when the touch electrodes 200 are arranged in a matrix, the first touch signal lines 202 corresponding to each touch electrode 200 are arranged in a row direction of the touch electrodes 200 and connected with the corresponding touch electrodes 200 respectively via a first via hole 204.

In an exemplary embodiment, as shown in FIG. 2, each touch electrode 200 corresponds to a plurality of second touch signal lines 206. In such a touch substrate, the second touch signal lines 206 corresponding to each touch electrode 200 are distributed in a comparatively concentrated manner, such that the touch signals can be transmitted via the second touch signal lines 206 as much as possible, so as to further shorten the distance over which the touch signals must be transmitted by the touch electrodes 200 having a poorer conductivity, thereby reducing the loss of the touch signals and improving the sensitivity of the touch substrate.

FIG. 4 schematically shows a top view of part of the touch substrate according to an embodiment of the present disclosure. Specifically, FIG. 4 schematically shows a touch electrode 400 of the touch substrate. The touch electrode 400 corresponds to a plurality of pixel units 410. The pixel units 410 are arranged in an array. The first touch signal lines 402 extend between two adjacent columns of pixel units 410, the second touch signal lines 406 extend between rows of pixel units 410, and the first via holes 404 and the second via holes 408 are located between different adjacent rows of pixel units 410. In the touch substrate, the aperture ratio of the touch screen can be improved by arranging the first via holes 404 and the second via holes 408 between different adjacent rows of pixel units 410. In the touch substrate, when the first via holes and the second via holes are too close, the aperture ratio of the touch screen will suffer a loss. Therefore, by arranging the first via holes and the second via holes between different adjacent rows of pixel units, the aperture ratio of the touch screen can be improved.

In the touch substrate as shown by FIG. 4, the touch electrode 400 is reused as a common electrode for the correspondingly plurality of pixel units 410. During a touch phase of the touch screen, the touch electrode 400 senses touch signals; and during a display phase of the touch screen, the touch electrode 400 functions as the common electrode of the pixel units.

Furthermore, as shown in FIG. 4, the touch substrate further comprises a plurality of gate lines 412 parallel with each other and a plurality of data lines 414 parallel with each other. An extension direction of the first touch signal lines 402 is parallel with the data lines 414, and an extension direction of the second touch signal lines 406 is parallel with the gate lines 412.

In an exemplary embodiment, the first touch signal lines 402 are arranged in a same layer as the data lines 414, and the second touch signal lines 406 are arranged in a same layer as the gate lines 412. In particular, the first touch signal lines 402 and the data lines 414 can be formed through a same patterning process, and the second touch signal lines 406 and the gate lines 412 can be formed through a same patterning process. This helps to simplify the fabrication procedure of the touch substrate.

In an exemplary embodiment, the touch substrate can further comprise: a first insulating layer arranged between the touch electrodes and the first touch signal lines; and a second insulating layer arranged between the first touch signal lines and the second touch signal lines. The first via holes penetrate the first insulating layer, and the second via holes penetrate both the first insulating layer and the second insulating layer. In such a touch substrate, when the first touch signal lines are arranged in a same layer as the data lines and the second touch signal lines are arranged in a same layer as the gate lines, the touch substrate corresponds to a bottom gate structure. Alternatively, the touch substrate can further comprise: a first insulating layer arranged between the touch electrodes and the second touch signal lines; and a second insulating layer arranged between the first touch signal lines and the second touch signal lines. The first via holes penetrate both the first insulating layer and the second insulating layer, and the second via holes penetrate the first insulating layer. In such a touch substrate, when the first touch signal lines are arranged in a same layer as the data lines and the second touch signal lines are arranged in a same layer as the gate lines, the touch substrate corresponds to a top gate structure.

Advantageously, the touch electrode comprises a transparent conductive material, the first insulating layer and the second insulating layer comprise a transparent insulating material, and the first touch signal line, the second touch signal line, the gate line and the data line comprise a conductive metallic material. The material of the touch electrode comprises transparent metals, transparent metal alloys, transparent metal oxides, carbon nano-tubes, graphene and so on. Materials of the first insulating layer and the second insulating layer comprise inorganic materials such as silicon oxides ($SiO_2$), silicon nitrides ($SiN_x$) and silicon oxynitrides ($SiO_xN_y$), and organic materials such as resin. Materials of the first touch signal line, the second touch signal line, the gate line and the data line comprises a conductive metallic material such as aluminum and molybdenum.

A touch screen is further provided in embodiments of the present disclosure, comprising any touch substrate as mentioned above. Such a touch screen can be applied to various display devices including any product or component having a display function, such as a cellphone, a tablet computer, a television, a display, a notebook computer, a digital photo frame, a navigator, electronic paper or the like.

Embodiments of the present disclosure provide a touch substrate and a touch screen. In the touch substrate and the touch screen, a plurality of second touch signal lines is arranged. In this case, when the user touches a central position of the touch electrodes closer to the touch detection chip and further away from touch detection chip, the touch signals will be transmitted to the second via holes closest to the first touch signal lines via the closest second touch signal lines, then to the first via holes via the second via holes and the touch electrodes, then to the first touch signal lines via the first via holes, and finally to the touch detection chip via the first touch signal lines. As compared with a conventional touch substrate, since the material for fabricating the second touch signal lines has a smaller resistivity than the material for fabricating the touch electrodes, the loss of the touch signals in the transmission path is greatly reduced. This ensures that in the entire touch substrate, different positions exhibit approximately the same touch sensitivity. Moreover, when the touch substrate is used together with an input tool having a small contact area such as a stylus, it can avoid the failure of the touch detection chip to detect touch signals, and hence improve the sensitivity of the touch substrate.

Unless otherwise defined, the technical terms or scientific terms as used in the present disclosure should have a common meaning understood by one having an ordinary skill in the art of the present disclosure. The wordings of "first", "second" or the like used in the present disclosure do not indicate any sequence, number or importance. Instead, they are only used to differentiate different components. Similarly, the wordings of "one", "a", "the" or the like also do not indicate any limitations to the number, but instead indicates the presence of at least one. The wordings of "comprise", "include" or the like mean that elements or objects in front of the wordings cover elements or objects listed after the wordings and equivalents thereof, and do not exclude other elements or objects. The wordings of "connect", "connection" or the like are not limited to physical or mechanical connection. Instead they can comprise electrical connections either direct or indirect. The wordings of "up", "down", "left", "right" or the like are only used for indicating relative position relations. When the absolute positions of the described objects are varied, the relative position relations may also be varied correspondingly. It should be noted that the features in the above embodiments can be combined for use at will on the premise that no conflicts are caused.

What are mentioned above are only specific embodiments of the present disclosure, but the protection scope of the present disclosure shall not be limited thereto. Any variation or substitution easily conceivable within the technical scope disclosed in the present disclosure for one having ordinary skills in the art shall fall within the protection scope of the present disclosure. Therefore, the protection scope of the present disclosure should be subject to the protection scope of the claims.

The invention claimed is:

1. A touch substrate, comprising:
    a plurality of touch electrodes arranged in a same layer and insulated from each other, the touch electrodes being configured to sense touch signals;
    a plurality of first touch signal lines configured to transmit the touch signals; and
    a plurality of second touch signal lines, an extension direction of the second touch signal lines being different from that of the first touch signal lines,
    wherein each of the plurality of touch electrodes is connected with a corresponding first touch signal line via a first via hole and is connected with a corresponding second touch signal line via a second via hole,
    wherein, in the extension direction of the second touch signal lines, the second touch signal lines corresponding to different touch electrodes are disconnected from each other,
    wherein, for each of the plurality of touch electrodes, an orthographic projection of a corresponding first touch signal line on a touch electrode intersects with an orthographic projection of a corresponding second touch line on the touch electrode.

2. The touch substrate according to claim 1, wherein the plurality of first touch signal lines are parallel with each other.

3. The touch substrate according to claim 1, wherein each touch electrode corresponds to a plurality of second touch signal lines.

4. The touch substrate according to claim 1, comprising pixel units arranged in an array, wherein the first touch signal lines extend between two adjacent columns of pixel units, the second touch signal lines extend between rows of pixel units, and the first via holes and the second via holes are located between different adjacent rows of pixel units.

5. The touch substrate according to claim 4, wherein each touch electrode corresponds to a plurality of pixel units and the touch electrode is reused as a common electrode for a correspondingly plurality of pixel units.

6. The touch substrate according to claim 1, further comprising a plurality of gate lines parallel with each other and a plurality of data lines parallel with each other, wherein an extension direction of the first touch signal lines is parallel with the data lines, and an extension direction of the second touch signal lines is parallel with the gate lines.

7. The touch substrate according to claim 6, wherein the first touch signal lines are arranged in a same layer as the data lines, and the second touch signal lines are arranged in a same layer as the gate lines.

8. The touch substrate according to claim 1, further comprising:
    a first insulating layer arranged between the touch electrodes and the first touch signal lines;
    a second insulating layer arranged between the first touch signal lines and the second touch signal lines;
    wherein the first via holes penetrate the first insulating layer, and the second via holes penetrate both the first insulating layer and the second insulating layer.

9. The touch substrate according to claim 1, further comprising:
    a first insulating layer arranged between the touch electrodes and the second touch signal lines;

a second insulating layer arranged between the first touch signal lines and the second touch signal lines;

wherein the first via holes penetrate both the first insulating layer and the second insulating layer, and the second via holes penetrate the first insulating layer.

10. The touch substrate according to claim 8, wherein, the touch electrode comprises a transparent conductive material; and the first insulating layer and the second insulating layer comprise a transparent insulating material.

11. A touch screen, comprising the touch substrate according to claim 1.

12. The touch substrate according to claim 9, wherein, the touch electrode comprises a transparent conductive material; and the first insulating layer and the second insulating layer comprise a transparent insulating material.

13. The touch screen according to claim 11, wherein the plurality of first touch signal lines are parallel with each other.

14. The touch screen according to claim 11, wherein each touch electrode corresponds to a plurality of second touch signal lines.

15. The touch screen according to claim 11,
wherein the touch substrate further comprises pixel units arranged in an array, and
wherein the first touch signal lines extend between two adjacent columns of pixel units, the second touch signal lines extend between rows of pixel units, and the first via holes and the second via holes are located between different adjacent rows of pixel units.

16. The touch screen according to claim 11,
wherein the touch substrate further comprises a plurality of gate lines parallel with each other and a plurality of data lines parallel with each other, and
wherein an extension direction of the first touch signal lines is parallel with the data lines, and an extension direction of the second touch signal lines is parallel with the gate lines.

17. The touch screen according to claim 11,
wherein the touch substrate further comprises:
a first insulating layer arranged between the touch electrodes and the first touch signal lines; and
a second insulating layer arranged between the first touch signal lines and the second touch signal lines;
wherein the first via holes penetrate the first insulating layer, and the second via holes penetrate both the first insulating layer and the second insulating layer.

18. The touch screen according to claim 11,
wherein the touch substrate further comprises:
a first insulating layer arranged between the touch electrodes and the second touch signal lines; and
a second insulating layer arranged between the first touch signal lines and the second touch signal lines;
wherein the first via holes penetrate both the first insulating layer and the second insulating layer, and the second via holes penetrate the first insulating layer.

\* \* \* \* \*